Figure 1:
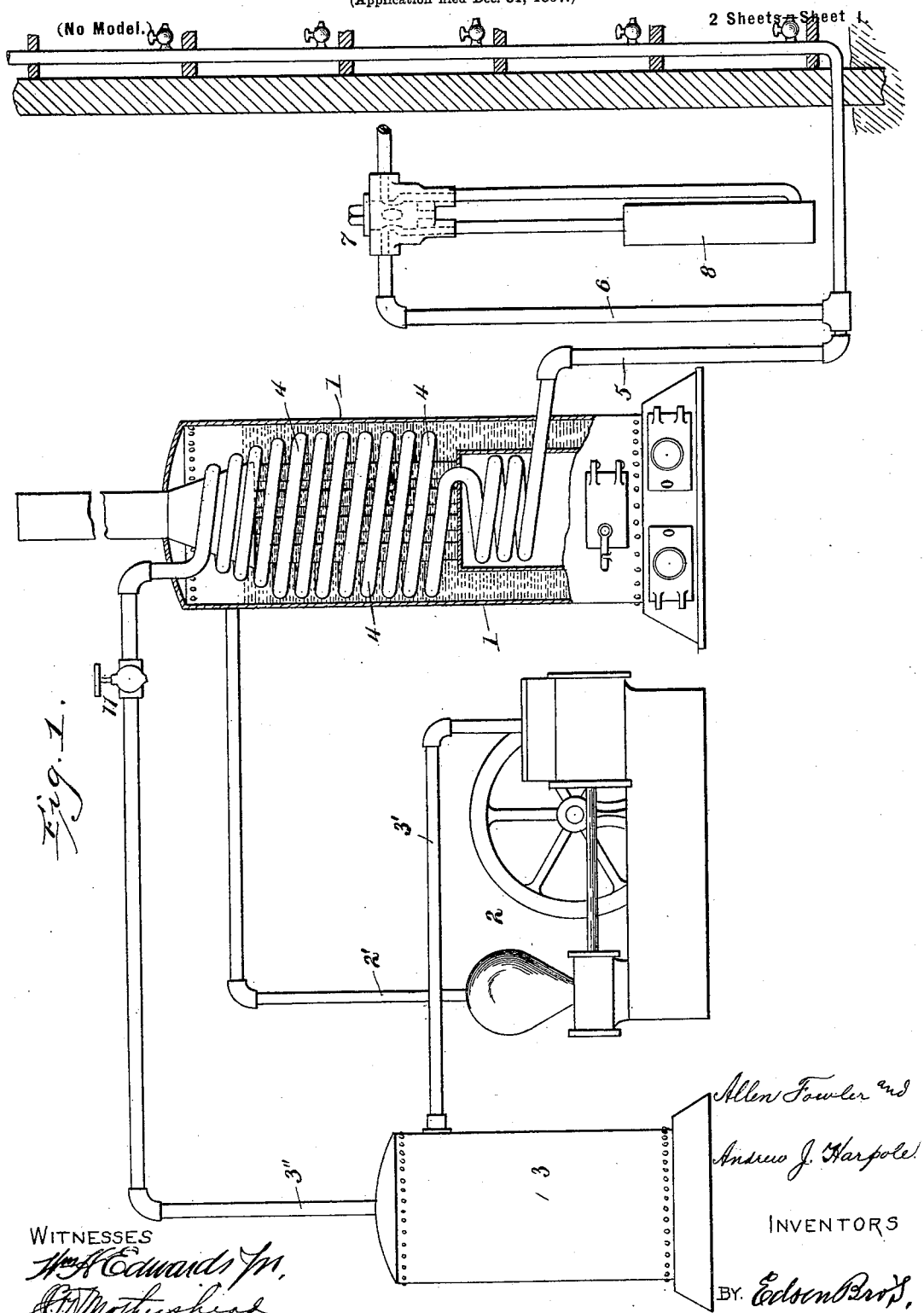

No. 631,868. Patented Aug. 29, 1899.
A. FOWLER & A. J. HARPOLE.
APPARATUS FOR COMPRESSING, STERILIZING, AND PURIFYING AIR.
(Application filed Dec. 31, 1897.)
(No Model.) 2 Sheets—Sheet 1.

No. 631,868. Patented Aug. 29, 1899.
A. FOWLER & A. J. HARPOLE.
APPARATUS FOR COMPRESSING, STERILIZING, AND PURIFYING AIR.
(Application filed Dec. 31, 1897.)
(No Model.) 2 Sheets—Sheet 2.

UNITED STATES PATENT OFFICE.

ALLEN FOWLER AND ANDREW J. HARPOLE, OF UNION CITY, TENNESSEE.

APPARATUS FOR COMPRESSING, STERILIZING, AND PURIFYING AIR.

SPECIFICATION forming part of Letters Patent No. 631,868, dated August 29, 1899.

Application filed December 31, 1897. Serial No. 664,920. (No model.)

*To all whom it may concern:*

Be it known that we, ALLEN FOWLER and ANDREW J. HARPOLE, citizens of the United States, residing at Union City, in the county of Obion and State of Tennessee, have invented certain new and useful Improvements in Apparatus for Compressing, Sterilizing, and Purifying Air; and we do hereby declare the following to be a full, clear, and exact description of the invention, such as will enable others skilled in the art to which it appertains to make and use the same.

The invention relates to an apparatus for compressing, sterilizing, and purifying air and eliminating therefrom all poisonous gases and disease-producing germs and utilizing the same for the purposes of warming, cooling, and ventilating dwellings, factories, hospitals, &c., and also for the purpose of propelling machinery.

The object of the invention is to promote health, prevent disease and epidemics, and furnish a cheap and economic means for raising or lowering the temperature in buildings, &c., and of maintaining pure air of uniform temperature, properly vitalized, in houses and other inclosures where the air is rendered impure by being successively and constantly breathed or where gases accumulate.

It is our purpose that while the compressed and purified air is being used for warming or cooling the atmosphere and for ventilation to also utilize the same for the manifold purposes for which compressed air may be used—such, for example, as a source of power for driving various kinds of machinery, &c.

We are aware that many diseases of the human body are communicated to others by infection or contagion, which often becomes epidemic in thickly-populated places by contact with the germs of such diseases which impregnate the surrounding atmosphere, and that many of such maladies may be prevented by properly sterilizing, purifying, and tempering the air and using the same for the purposes of ventilation.

The apparatus for carrying out the invention consists of a steam-boiler having a furnace and a coiled air-pipe located in the boiler, an air-compressor, an air-receiver, a main pipe for conducting the air to the place of use, a lateral pipe, a switch-valve in the lateral pipe leading from the main, a reservoir located in the earth, beneath the surface thereof, for the purpose of tempering the air, and of pipes for distributing the air to different points or to different apartments or stories of a building or other place where it is to be used.

To enable others to fully understand and use the invention, we have illustrated the preferred form of mechanism employed on the accompanying drawings, forming a part of this specification, and on which like numerals of reference denote corresponding parts in the different views.

Figure 2:
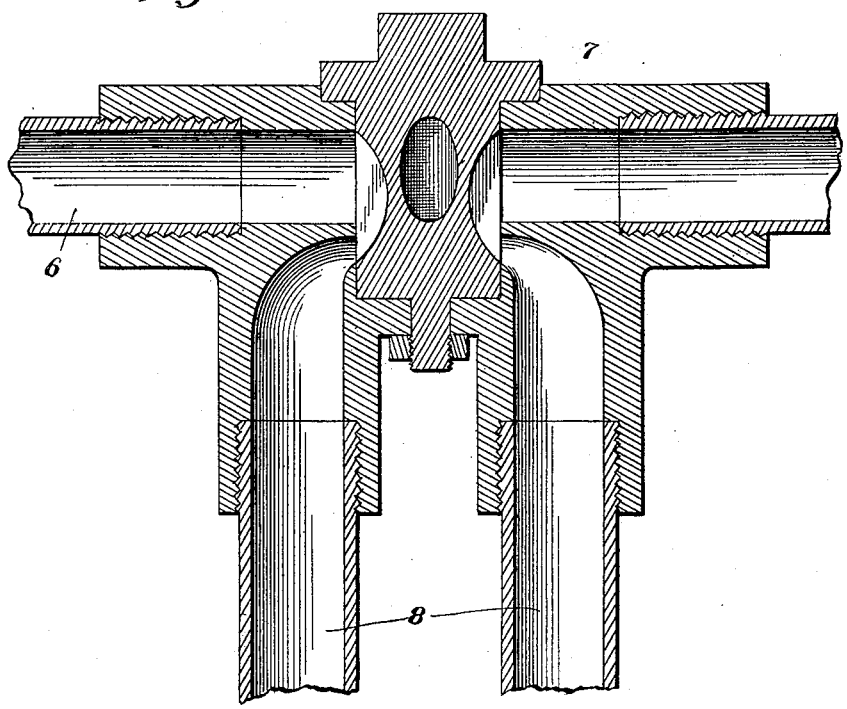
Figure 3:
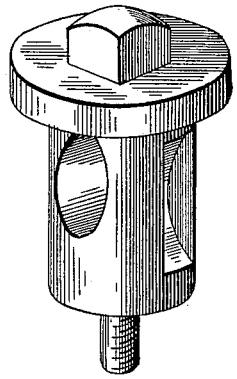

Figure 1 is a diagrammatic view, and Fig. 2 shows a two-way valve which connects the main and lateral pipes. Fig. 3 is a detail view of the two-way valve.

1 is the boiler. It is provided with a suitable fire-box or furnace and contains within its cylinder the coiled pipe 4. An upright submerged flue-boiler is shown on the drawings, but any suitable boiler may be used.

2 is the air-compressor, which is of the usual form and needs no detailed description. It is operated by steam supplied to the piston or pistons thereof through the supply tube or pipe 2', which is connected with the boiler 1.

3 is a tank or receiver for the air after it has been compressed. The air as it is compressed passes through the pipe 3' to the tank. A feed-pipe 3" extends preferably from the top of the tank or receiver 3 and extends into the boiler or is connected to the coil therein at the top of said coil.

11 is a gate-valve in the pipe 3" for regulating the supply of compressed air to the boiler or to the coil therein.

The coil 4 in the boiler, which is preferably used, has an outlet at the side of the boiler above the fire-box or furnace, or if it should be desired to subject the air to a very high degree of heat and to dry out all moisture that may be in it the coiled pipe is continued down into the fire-box or furnace of the boiler and brought into direct contact with the fire; but for all ordinary purposes it is sufficient to pass the compressed air through the coils of the pipe in the steam and hot water in the boiler.

It will be seen that the air is first compressed and passed into the receiver 3 before it is heated and where it is practically cool, its temperature being raised only by friction and the act of compression.

Connected to the coil 4 at the point where it emerges from the boiler is attached the main pipe 5, which if hot, compressed, and vitalized air is desired it is conveyed thereby to the point where it is designed to be used. If, however, it is desired to temper and cool the compressed and vitalized air, which has been purified and the disease germs destroyed by passing through the coil or boiler, a lateral pipe 6 is used; but it will be understood, of course, that we also use the lateral pipe or pipes for distributing the air from the main pipe. The pipe 6 at one end is connected with the main 5 and at its juncture therewith a suitable cut-off valve may be employed or a valve may be used at a different point in pipe 6, as will be hereinafter explained. In the embodiment of our invention illustrated in the accompanying drawings it will be seen that we have arranged the valve 7 at a point in the pipe 6 beyond its connection with the main 5, and it will be understood that said pipe 6 beyond said valve 7 will be connected with the distributing-pipe 10.

The pipe 6 extends to a storage-reservoir 8, which is sunk in the earth a proper distance. The reservoir 8 is to be made long in proportion to its diameter and is set in the ground in a vertical position with a pipe leading down from the lateral pipe or switch valve therein, as 7, and connected to said reservoir at its top, and through the pipe the air is conducted into said storage tank or reservoir. There is also another pipe 18 connected to said reservoir at or near its bottom and leading up to the lateral pipe at a point beyond the valve 7 for the purpose of conducting the air out of the reservoir back into the lateral pipe, from which through suitable valves and distributing-pipes it can be conducted to any point where it is desired to use the purified and tempered air.

The construction of valve which we prefer to employ and which has been hereinbefore generally designated by the numeral 7 is illustrated in Figs. 2 and 3. As shown, it consists of a cylindrical body which is suitably mounted in the coupling 12, by which the sections of pipe 6 are connected to the pipes or ducts 17 18. This valve is rotatably mounted in its support or seat and is provided with a head 19, adapted to be engaged by a suitable wrench or key when it is desired to adjust or vary the position of the valve. 14 designates a passage extending through the body of the valve, and 15 16 two grooves or ways formed in that body at points between the ends of said passage and diametrically opposite to each other. By reference to Fig. 2 it will be seen that when the valve is so adjusted as to bring the passage 14 in a position at right angles to the line of the pipe 6 adjacent to the valve the grooves or ways 15 16 will be so positioned as to establish communication between the pipe 6 and the reservoir 8—that is, the groove 15 will connect the pipe 6 at one side of the valve with the pipe 17, by which the compressed and heated air is conducted to the reservoir 8, while the groove or way 16 will connect the outlet 18 from the reservoir with the pipe 6 on the opposite side of the valve, so that when the valve is adjusted to the position shown in this Fig. 2 the compressed air will be compelled to pass around through the pipe 17, reservoir 8, and pipe 18, while if the valve is adjusted to bring the passage 14 in line with the pipe 6 the air will pass directly through such passage and not into the pipe 17.

The object of taking the air from the bottom of the reservoir is to get the coolest air, which is at the bottom, the air being warmer on top. This plan also gets rid of the water of condensation if any should accumulate in the reservoir or storage-tank.

The valve 7 is shown in detail in Figs. 2 and 3, and it will be seen that by turning the valve the parts are opened or closed so that compressed air may be admitted to and discharged from the storage reservoir or cylinder or retained therein.

By the mechanism and steps above described air is compressed, purified, and tempered, if desired, and distributed in any desired building or other place for heating, cooling, and ventilation.

The valve 11 regulates the supply of air to the boiler or may be used to cut it off altogether.

The air is heated while passing through the coiled pipe in the boiler or in the boiler and furnace in a manner already described and that will be apparent. The air is conveyed through the main and conducted to the place or places of use. The main is preferably below the surface of the street, and lateral pipes connecting therewith are laid for the purpose of conveying the air to different places and for different uses.

Among the many advantages of the invention is the economic manner of either warming or cooling a room or apartment with air that has been purified and thoroughly vitilized, as well as the additional advantage of supplying power for driving suitable motors for propelling machinery in shops and factories, as well as for domestic use in running sewing-machines, churns, washing-machines, &c. It is a well-known fact that pure air and proper ventilation are conducive to good health, especially during sleep and when the body is at rest and the muscular system is relaxed. By the invention a person whether asleep or awake is constantly supplied with all the vitalizing elements of pure air tempered to suit the condition of the consumer, and thus preserving health and preventing disease. The air is allowed to flow out of the pipes into the room through jets prepared for that purpose, and a gentle flow may even be allowed to escape in the bed of the sleeper by means of a small flexible tube, thus driving away all the perspiratory gases from the body, and in hospitals patients may be more successfully treated where the air is always pure and fresh and tempered to suit the condition of the patient.

When the compressed and sterilized air is designed for heating purposes, especially if it should be transmitted any considerable distance before distribution, it will not retain heat sufficiently for advantageously heating a building or apartment, and under these conditions the air is reheated at the distributing-point by any suitable apparatus, a specific form of which will be made the subject of another application.

The vitiated air in the sick room may be drawn off through a proper flue prepared for that purpose and all of its impurities consumed in a furnace at the lower end of said flue before the air is discharged into the outer atmosphere and pure vitalized air be substituted, and thus a circulation of pure air is kept up in the sick room all the time.

Having thus fully described the invention and the best means of carrying it into effect, what we claim as new, and desire to secure, is—

1. In an apparatus for distributing compressed air at different temperatures, the combination of an air-compressor, a supply duct or pipe adapted to receive air compressed in said compressor, means for heating the compressed air, a distributing-pipe, a cooling-reservoir, connected with said distributing-pipe, and a valve arranged in the pipe system and adapted to allow the heated air to pass directly to the point of distribution or to cause said air to first pass through the cooling-reservoir, substantially as set forth.

2. In an apparatus for the purpose specified, the combination of an air-compressor, a supply duct or pipe adapted to receive air compressed in said compressor, means for heating the compressed air, a distributing-pipe, a cooling-reservoir, a valve arranged in one of the pipes, 6, of the system, a pipe, 17, for conducting compressed air from said pipe, 6, at one side of the valve to the cooling-reservoir, and an outlet-pipe, 18, leading from said reservoir to the pipe, 6, on the opposite side of the valve from the pipe, 17, the valve having formed therein a passage, 14, adapted to connect the two sections of the pipe, 6, and having also grooves or ways, 15, 16, adapted, when the passage, 14, is out of alinement with the pipe, 6, to connect said pipe, 6, with the pipes, 17, 18, respectively, substantially as set forth.

In testimony whereof we affix our signatures in presence of two witnesses.

ALLEN FOWLER.
ANDREW J. HARPOLE.

Witnesses:
H. T. BUTLER,
T. D. EDWARDS.